United States Patent
McGarry et al.

(10) Patent No.: US 12,271,470 B2
(45) Date of Patent: Apr. 8, 2025

(54) SYSTEM AND METHOD FOR DETECTING AND REPORTING SYSTEM CLOCK ATTACKS WITHIN AN INDICATORS OF ATTACK PLATFORM

(71) Applicant: Dell Products, L.P., Round Rock, TX (US)

(72) Inventors: Marc N. McGarry, Murphy, TX (US); Nizar A. Basan, Garland, TX (US); Weiqing Cai, Dallas, TX (US)

(73) Assignee: Dell Products, L.P., Round Rock, TX (US)

( * ) Notice: Subject to any disclaimer, the term of this patent is extended or adjusted under 35 U.S.C. 154(b) by 357 days.

(21) Appl. No.: 17/653,303

(22) Filed: Mar. 3, 2022

(65) Prior Publication Data

US 2023/0281301 A1 Sep. 7, 2023

(51) Int. Cl.
G06F 21/55 (2013.01)

(52) U.S. Cl.
CPC ...... *G06F 21/552* (2013.01); *G06F 2221/034* (2013.01)

(58) Field of Classification Search
CPC .............. G06F 21/552; G06F 2221/034
See application file for complete search history.

(56) References Cited

U.S. PATENT DOCUMENTS

| 10,727,966 B1 * | 7/2020 | Izenberg | H04J 3/0676 |
| 2019/0319972 A1 * | 10/2019 | Desai | H04L 63/1425 |

FOREIGN PATENT DOCUMENTS

| BR | PI0815605 B1 | * | 9/2020 | |
| CN | 103403680 A | * | 11/2013 | ........... G06F 1/3203 |
| CN | 111049858 A | * | 4/2020 | ......... H04L 63/1416 |
| CN | 111399367 A | * | 7/2020 | ............. G04R 20/26 |

OTHER PUBLICATIONS

Diana Gratiela Berbecaru • Silvia Sisinni • Antonio Lioy • Benoit Rat • Davide Margaria • Andrea Vesco; Mitigating Software Integrity Attacks With Trusted Computing in a Time Distribution Network; IEEE Access (vol. 11, 2023, pp. 50510-50527); (Year: 2023).*

Bishop, M.; A security analysis of the NTP protocol version 2; Proceedings of the Sixth Annual Computer Security Applications Conference (1990, pp. 20-29); (Year: 1990).*

Rossberg, M. • Golembewski, R. • Schaefer, G.; Attack-Resistant Distributed Time Synchronization for Virtual Private Networks; 2012 21st International Conference on Computer Communications and Networks (ICCCN) (2012, pp. 1-8); (Year: 2012).*

* cited by examiner

*Primary Examiner* — Luu T Pham
*Assistant Examiner* — Chao Wang
(74) *Attorney, Agent, or Firm* — Fogarty LLP

(57) ABSTRACT

According to one embodiment, an Information Handling System (IHS) includes a memory to store a secure event log associated with one or more attributes of the IHS, and computer-executable code to obtain a system time from a system clock of the IHS, obtain a network time from a network time protocol (NTP) server, and compare the system time against the network time. When the obtained system time does not match the obtained network time, set a system clock attack chain vector in the secure event log and generate an Indicator of Attack (IoA) report based at least in part, on the system clock attack chain vector.

16 Claims, 6 Drawing Sheets

SYSTEM AND METHOD FOR DETECTING AND REPORTING SYSTEM CLOCK ATTACKS WITHIN AN INDICATORS OF ATTACK PLATFORM

BACKGROUND

As the value and use of information continues to increase, individuals and businesses seek additional ways to process and store information. One option available to users is information handling systems to be general or configured for a specific user or specific use such as financial transaction processing, airline reservations, enterprise data storage, or other systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information aware communications. In addition, information handling systems may include a variety of hardware and software components that may be configured to process, store, and communicate information and may include one or more computer systems, data storage systems, and networking systems.

The availability of networked computing can render users vulnerable to attack by malicious actors, also known as hackers. Attempts at malicious attacks on an IHS can take the form of many different attack vectors. Common attack vectors for achieving access to or control of resources of an IHS may include malware (e.g., viruses, worms, trojans, etc.), buffer overflow attacks, cross-site scripting attacks (XSS), and phishing attacks. Many of these attacks operate by exploiting weaknesses in the security of a specific IHSs' configuration and setup. Specific computing environments made available securely over a network will attract specific threat sources and actors with attack vectors that are continually evolving and becoming more sophisticated. Attack vectors generally refer to events that, when they occur on an IHS in a certain pattern, may indicate that an indicator of attack (e.g., cyber threat) has occurred or is about to occur.

In order to police access to computer resources, and to help avert cyber-attacks, monitoring of IHSs in order to detect cyber threats is of crucial importance. In this respect, secured computer environments are often provided with an Indicator of Attack (IoA) framework where events that occur on an IHS may be continually monitored for such cyber-attacks. Such IoA frameworks, for example, may be administered according to Security Information Management (SIM), Security Event Management (SEM), and/or Security Information and Event Management (SIEM) guidelines.

SUMMARY

According to one embodiment, an Information Handling System (IHS) includes a memory to store a secure event log associated with one or more attributes of the IHS, and computer-executable code to obtain a system time from a system clock of the IHS, obtain a network time from a network time protocol (NTP) server, and compare the system time against the network time. When the obtained system time does not match the obtained network time, set a system clock attack chain vector in the secure event log and generate an Indicator of Attack (IoA) report based at least in part, on the system clock attack chain vector.

According to another embodiment, a method includes the steps of obtaining a system time from a system clock of the HIS, obtaining a network time from a network time protocol (NTP) server, and comparing the system time against the network time. When the obtained system time does not match the obtained network time, the method further includes the step of setting a system clock attack chain vector in a secure event log of the IHS and generate an Indicator of Attack (IoA) report based at least in part, on the system clock attack chain vector.

According to yet another embodiment, a hardware memory device has program instructions stored thereon that, upon execution by a processor of an Information Handling System (IHS), cause the IHS to obtain a system time from a system clock of the HIS, obtain a network time from a network time protocol (NTP) server, and compare the system time against the network time. When the obtained system time does not match the obtained network time, the instruction further cause the IHS to set a system clock attack chain vector in a secure event log of the IHS and generate an Indicator of Attack (IoA) report based at least in part, on the system clock attack chain vector, and when the obtained system time matches the obtained network time, reset the system clock attack chain vector in the secure event log of the IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
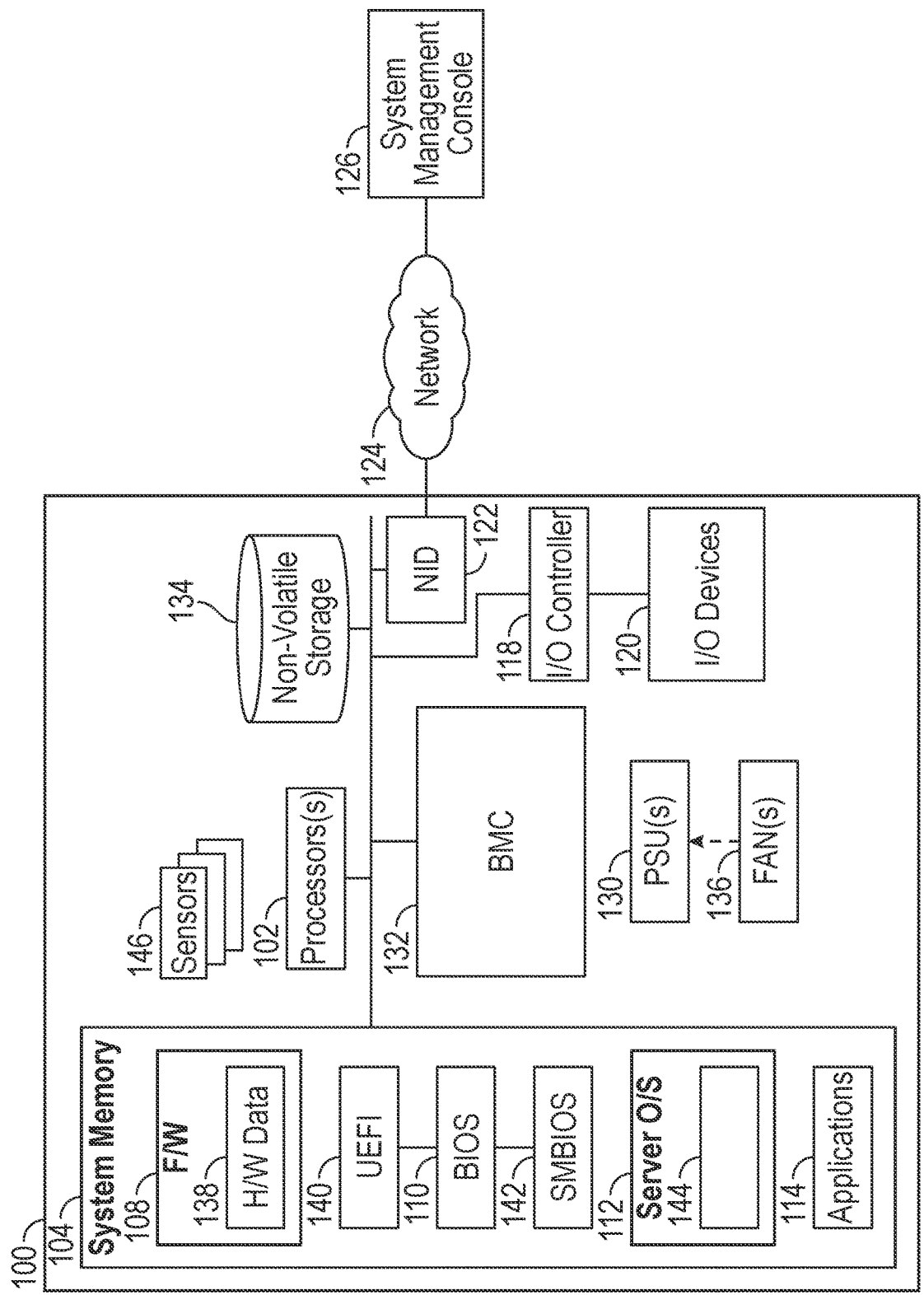
FIG. 1 is a block diagram of examples of several hardware devices of an Information Handling System (IHS) that may be used to implement the system time attack detection and reporting system according to one embodiment of the present disclosure.

Embodiments described herein comprise a system clock detecting and reporting system and method for use in an Indicators of Attack (IoA) framework. Whereas a system clock in an Information Handling System (IHS) can be changed by users with sufficient privileges, malicious users can alter the system clock to hide the actual time of an event or force processing to occur that normally occurs at a later date. The system clock detecting and reporting system and method may be used to detect tampering with the system clock by comparing it to one or more trusted time sources and then report when tampering has been detected using an IoA framework.

The system clock in an IHS (e.g., personal computer, laptop computer, tablet PC, set-top box (STB), personal digital assistant (PDA), mobile device, desktop computer, communications device, etc.) can be changed by users with sufficient privileges. Malicious users can also alter the system clock to hide the actual time of an event or force processing to occur that normally occurs at a later date. As such, it would be beneficial to continually monitor the date and time settings of the system clock of an IHS so that changes to the system clock, whether intentional or inadvertent, are quickly detected, and remediation actions taken, such as by notifying administrative personnel or the owner of the IHS that its system clock has been changed to an illicit setting.

As will be described in detail herein below, embodiments of the present disclosure provide a system and method for detecting and reporting system clock changes that compares the system clock settings against one or more online network time protocol (NTP) servers so that if the system clock changes to an illicit value, the system and method may generate an alert message to notify responsible personnel that the system clock settings have become invalid. In some embodiments, the system and method for detecting and reporting system clock changes may be implemented as part of an Indicators of Attack (IoA) framework that continually monitors for potentially illicit activities that may occur to various attributes within a Basic Input/Output System (BIOS) portion of the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), network storage device, or any other suitable device and may vary in size, shape, performance, functionality, and price.

The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of several hardware devices of an Information Handling System (IHS) that may be used to implement the system time attack detection and reporting system according to one embodiment of the present disclosure. Particularly, IHS 100 includes one or more processor(s) 102 coupled to system memory 104 via system interconnect 106. System interconnect 106 may include any suitable system bus. System memory 104 may include multiple software and/or firmware modules including firmware (F/W) 108, basic input/output system (BIOS) 110, server operating system (OS) 112, and/or application(s) 114. Software and/or firmware module(s) stored within system memory 104 may be loaded into processor(s) 102 and executed during operation of IHS 100.

FAN 108 may include hardware device data 138 that is used to store information associated with certain hardware devices (e.g., processor(s) 102, system memory 104, non-volatile storage 134, NID 122, I/O controllers 118, power supply unit(s) 130, Fan(s) 136, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of IHS 100. This feature can eliminate the need for the operating system to probe hardware directly to discover what devices are present in the computer.

IHS 100 includes one or more input/output (I/O) controllers 118 which support connection by and processing of signals from one or more connected input/output (I/O) device(s) 120, such as a keyboard, a mouse, a touch screen, a microphone, a monitor or a display device, a camera, a microphone, audio speaker(s) (not shown), an optical reader, a universal serial bus (USB), a card reader, a Personal Computer Memory Card International Association (PCMCIA) slot, and/or a high-definition multimedia interface (HDMI) that may be included or coupled to IHS 100.

IHS 100 also includes a Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more PSUs 130. PSUs 130 power the hardware devices of IHS 100 (e.g., processor(s) 102, system memory 104, non-volatile storage 134, NID 122, I/O controllers 118, I/O devices 120, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may include a baseboard processor, or other microcontroller, that operates management software for supporting remote monitoring and administration of IHS 100. BMC 132 may be installed on the motherboard of IHS 100 or may be coupled to IHS 100 via an expansion slot provided by the motherboard. In support of remote monitoring functions, NID 122 may support connections with BMC 132 using wired and/or wireless network connections via a variety of network technologies. In other embodiments, BMC 132 may include or may be an integral part of a Chassis Management Controller (CMC). As a non-limiting example, the BMC 132 may include an integrated Dell Remote Access Controller (iDRAC) from Dell® embedded within Dell PowerEdge™ servers. The iDRAC provides functionality that helps information technology (IT) administrators deploy, update, monitor, and maintain servers remotely, such as via system management console 126. Additionally, the server O/S 112 may include a BMC service module 144 that interfaces with BMC 132 to perform, among other things, managing the hardware devices of IHS 100 from the O/S 112 using in-band management connection. BMC service module 144 will be discussed in detail herein below.

BMC 132 may be configured to provide out-of-band management facilities for IHS 100. Management operations may be performed by BMC 132 even if IHS 100 is powered off, or powered down to a standby state. BMC 132 may include an out-of-band network interface separate from and physically isolated from an in-band network interface of IHS 100, and/or other embedded resources. In one embodiment, BMC 132 may support monitoring and administration of the hardware devices of IHS 100 via a sideband bus interface, such as an I2C sideband bus that may be individually established with some, most, or all of the respective hardware devices.

Figure 2:
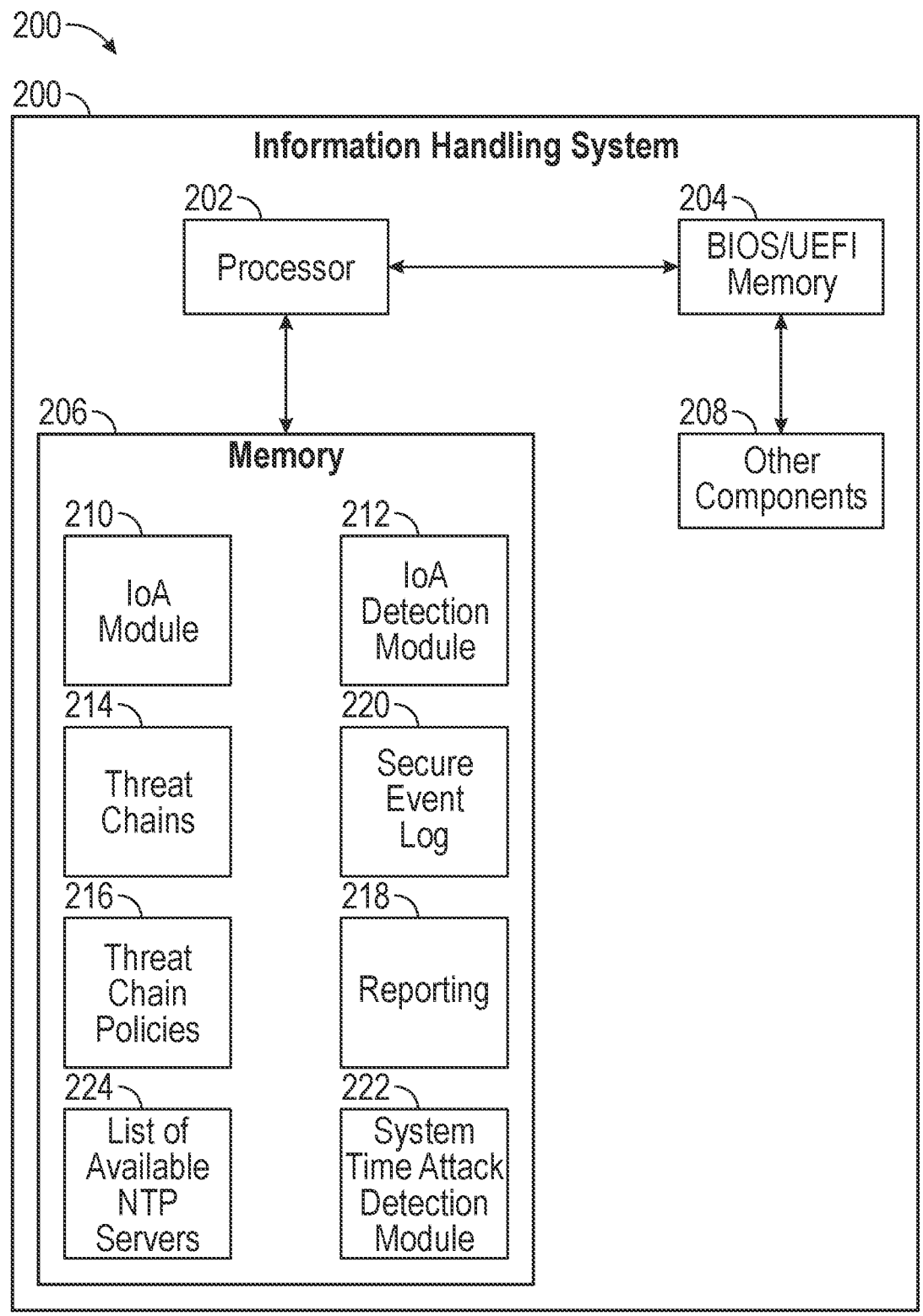
FIG. 2 illustrates certain elements of an information handling system that may be used to implement the system clock detecting and reporting system according to at least one embodiment of the disclosure.

Information handling system 100, for example, may include any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the IHS 100 can be implemented using electronic devices that provide voice, video, or data communication. Further, while a single information handling system 100 is illustrated, the term "system" shall also be taken to include any collection of systems or subsystems that individually or jointly execute a set, or multiple sets, of instructions to perform one or more computer functions.

FIG. 2 illustrates certain elements of an information handling system 200 that may be used to implement the system clock detecting and reporting system according to at least one embodiment of the disclosure. Information handling system 200 includes a processor 202, a basic input/output system (BIOS)/unified extensible firmware interface (UEFI) (BIOS/UEFI) memory 204, another memory 206, and other components 208. For example, processor 202 may access BIOS/UEFI memory 204 to scan BIOS attributes stored within the BIOS/UEFI memory as will be discussed herein. Processor 202 may access memory 206 to perform one or more suitable operations including, but not limited to, store and retrieve data, and execute one or more applications. In certain examples, other components 208 may include any additional suitable components of information handling system 200 without varying from the scope of this disclosure.

Memory 206 may store data accessible by processor 202, and may also store any suitable modules and applications executable by the processor. For example, memory 206 includes indicators of attack (IoA) module 210, an IoA detection module 212, multiple threat chains 214, multiple threat chain policies 216, a reporting module 218, a secure event log 220, a system time attack detection module 222, and a list of available Network Time Protocol (NTP) servers 224. For example, IoA module 210, IoA detection module 212, threat chains 214, threat chain policies 216, and reporting module 218, system time attack detection module 222, and the list of available Network Time Protocol (NTP) servers 224 may be incorporated within an OS of information handling system, and may be utilized by processor 202 to detect IoAs of the information handling system. In certain examples, IoA module 210, IoA detection module 212, threat chains 214, threat chain policies 216, reporting module 218, system time attack detection module 222, and the list of available Network Time Protocol (NTP) servers 224 may be components of a BIOS/UEFI security agent configured to be executed by processor 202 to detect security threats by monitoring BIOS attributes changes made within BIOS/UEFI memory 204.

One example of a suitable security agent may include at least a portion of a SafeBIOS Events & Indicators of Attack tool provided from Dell Technologies. The SafeBIOS Events & Indicators of Attack tool works by detecting changes to an IHS's BIOS configuration and raising an alert (e.g., report) when a cyber-attack occurs or is about to occur. When implemented in an enterprise setting, the BIOS Events & Indicators of Attack may allow certain users (e.g., administrators) to analyze events that may be indicative of bad actors targeting the BIOS on enterprise IHSs. While these bad actors may change attributes of the BIOS to gain access to enterprise IHSs locally or remotely, the attack vectors can be monitored and then mitigated using the BIOS Events & Indicators of Attack tool to monitor and report changes to BIOS attributes as they occur.

Each threat chain 214 may include one or more BIOS/UEFI attribute changes that, if detected, may be indicative of a threat or attack. Each BIOS/UEFI attribute change may be represented by a modification to the attribute in any suitable manner including, but not limited to, a binary flag, a selection from a list associated with the BIOS/UEFI configuration. The threat chain 214 may contain a threat chain policy 216.

For example, a threat chain policy 216 for a particular threat chain 214 may include a collection of BIOS attribute states that indicate a specific attack. For example, threat chain policy 214 may include a name, category, and list of one or more threat criteria for a particular attack. In certain examples, a threat chain policy 216 may include an initially empty history of matched threat criteria and an initially empty history of matched threat events. The history of matched threat criteria may be used to identify when the threat chain state is clear, partially matched, or fully matched as described below. For example, the history of matched threat events may be saved to provide detailed reporting to the user of information handling system 200.

For example, reporting module 218 includes program instructions that, upon execution by processor 202, may issue alerts, reports, and/or notifications to an administrator or the user about a detected BIOS/UEFI attack. In some cases, memory 206 may store, in secure event log 220, historical values for BIOS attributes as they change over time. In other cases, memory 206 may retain, in secure event log 220, only the currently set value for each BIOS attribute.

With respect to parameters collected concurrently with attribute changes, in some cases, a given BIOS attribute change may be associated with a "boot number" value that indicates, with respect to a preceding BIOS attribute change, whether the given change must be made in the same boot cycle, in a subsequent boot cycle, within a number of boot cycles, or after a number of boot cycles of information handling system 200, in order for an attack to match a particular threat chain 214. Additionally, or alternatively, a threat chain 214 may include a time interval between a first BIOS attribute change and a second BIOS attribute change, such that, in order for an attack to match a particular threat chain, the second change must be made within the time interval or after the time interval. Concurrently with the detection of BIOS/UEFI attribute value changes, a timestamp associated with each such change may also be stored and evaluated.

In certain examples, operations performed by IoA module 210, IoA detection module 212, threat chains 214, threat chain policies 216, and reporting module 218 may be executed in any suitable dedicated hardware device including, but not limited to, field-programmable gate array (FPGA) circuitry and an application-specific circuit (ASIC) without varying from the scope of this disclosure. Execution, by processor 202, of one or more of IoA module 210, IoA detection module 212, threat chains 214, threat chain policies 216, and reporting module 218 will be described with respect to FIGS. 3 and 4 below.

Figure 3:
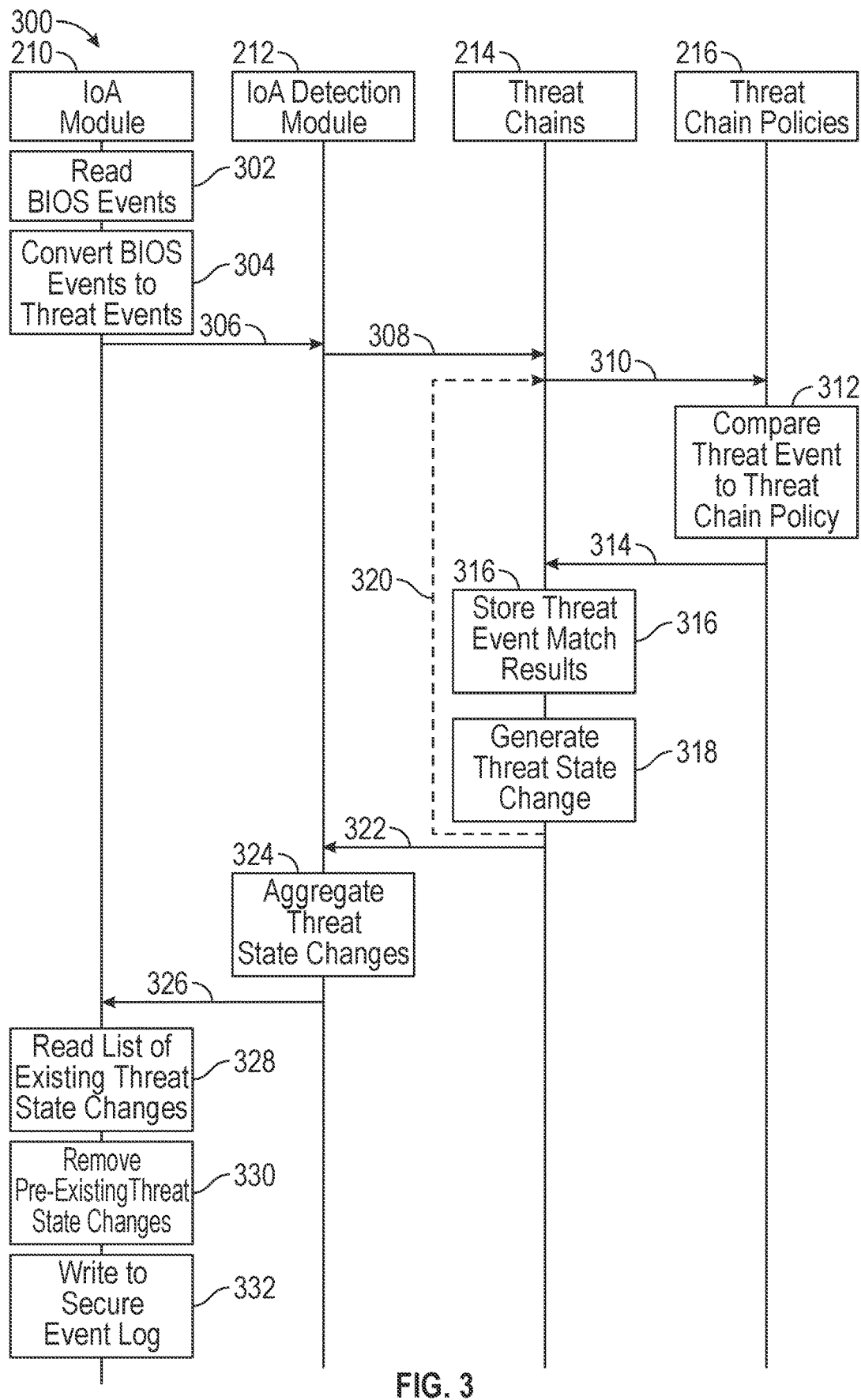
FIG. 3 illustrates an Indicators of Attack (IoA) method that may be performed to detect and identify various IoAs according to one embodiment of the present disclosure.

FIG. 3 illustrates an Indicators of Attack (IoA) method 300 that may be performed to detect and identify various IoAs according to one embodiment of the present disclosure. In one embodiment, the IoA method 300 is performed by a processor, such as processor 202 of FIG. 2. For example, processor 202, or any other suitable device, may scan BIOS attributes within memory 204 to receive a current attribute state for each of the BIOS attributes. Processor 202 may compare the current state of each BIOS attribute to an original state of the corresponding BIOS attribute to determine whether a state change has occurred. For example, the original states of the BIOS attributes may be stored in any suitable memory including, but not limited to, secure event log 220 of memory 206 in FIG. 2. Based on one or more BIOS attribute state changes, processor 202 may store BIOS events in secure event log 220.

At step 302, IoA module 210 may read BIOS events from secure event log 220. For example, a BIOS event may any suitable data in any suitable format to indicate a BIOS attribute state change. For an example, the BIOS event may be true/false, on/off, a numerical value, or the like. At step 304, IoA module 210 may convert the BIOS events to threat events. For example, IoA module 210 may convert the BIOS event in any suitable manner including, but not limited to, converting the BIOS event from its current format to a string format for the threat event. The string format for a particular threat event may include 'attribute name, current value'. For example, a threat event may include 'secure boot, off', and this threat event may indicate that BIOS attribute 'secure boot' has changed from an 'on' state to an 'off' state.

At step 306, IoA module 210 may provide the threat events to IoA detection module 212. In certain examples, IoA module 210 may determine whether the threat event has been previously detected and sent to IoA detection module 212. If so, IoA module 210 may not notify IoA detection module of the threat event. At step 308, IoA detection module 212 may provide each threat event to each threat chain 214 of information handling system 200. For example, IoA detection module 212 may include a list of threat chains 214, processing of the IoAs, or the like. In certain examples, a threat chain may include one or more BIOS attribute states that may indicate that an attack is in progress or has occurred, or may potentially occur. For example, a threat chain may include a list of three BIOS attributes and all of the three BIOS attributes should have a threat event associated with the BIOS attribute to indicate an attack is in progress, has occurred, or is about to occur.

At step 310, the threat events are provided to each of threat chain policies 216 for the threat chains 214. In certain examples, operations 312, 314, 316, and 318 may be repeated for each threat chain 214 as illustrates by dashed arrow 320. For example, each of the threat events is provide to a first threat chain policy 216 for a first threat chain 214. At step 312, the threat chain policies 216 may be compared against each threat event to the threat criteria for the associated threat chain 214. Based on the comparison of all threat events to all threat criteria, the method may return a threat event match results for each threat event at step 314. For example, the threat event match results may indicate whether a particular threat event matches one of the criteria for threat chain 214.

At step 316, the threat event match results may be stored. In certain examples, the threat event match results may be stored within any suitable memory including, but not limited to, memory 206. For example, a history, such as any threat event match results obtained previously may be stored on a threat chain-by-threat chain basis. At step 318, a threat state change is generated for threat chain 214. For example, a determination is made whether an attack associated with a particular threat chain 214 appears or clears. For example, a current status of an attack may be compared with a previous status of the attack to determine whether the attack has appeared or has cleared. The generated threat state change may be associated with a severity of the threat state, such as not changed, partially changed, or fully changed. The threat state change may also include a threat chain identifier and a category for a matching threat chain. The threat state change may further include any other suitable information about the threat event and threat chain including, but not limited to, a previous threat state of the threat chain, a current threat state of the threat change, a timestamp describing when the threat state change was created, and a threat event history of the threat chain after the threat event was processed. If additional threat chains 214 are present in the information handling system, the operations loop as indicated by arrow 320.

At step 322, a list of threat state changes is provided to IoA detection module 212. For example, a single threat state change may be provided for each threat chain 214. At step 324, IoA detection module 212 may aggregate the threat state changes from all threat chains 214. At step 326, the aggregated list of threat state changes is provided to IoA module 210. At step 328, IoA module 210 reads a list of existing threat state changes from secure event log 220. At step 330, IoA module 210 removes pre-existing threat state changes from the aggregated list. For example, IoA module 210 may compare the threat state changes in the aggregated list to the existing threat state changes and remove any matching threat state changes from the aggregated list.

At step 332, the threat state changes in the aggregated list are written to secure event log 220 and a user of the information handling system is notified of the threat state changes. For example, the user may be notified in any suitable manner including, but not limited to, the threat state changes being written to a log and a message displayed on a console of the information handling system. In certain examples, the threat state changes may include any suitable data associated with the threat state change including, but not limited to, a timestamp indicating when the state changed occurred. For example, the user may also be notified about the timestamp associated with the threat state change.

Figure 4:
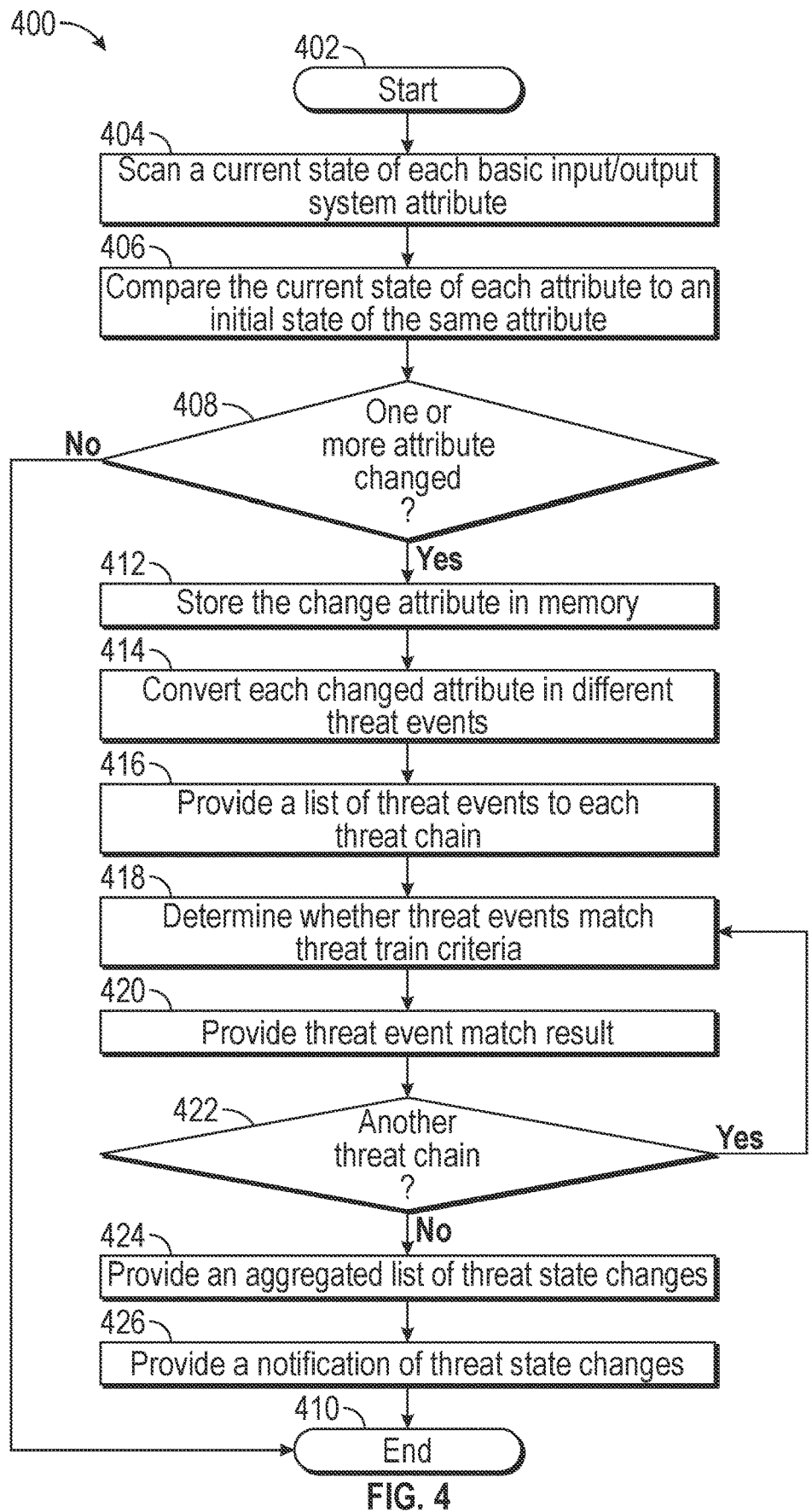
FIG. 4 is a flow diagram depicting method for detecting and reporting indicators of attack in an information handling system according to one embodiment of the present disclosure.

FIG. 4 is a flow diagram depicting method 400 for detecting and reporting indicators of attack in an information handling system according to one embodiment of the present disclosure. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 in FIG. 2, or any other type of system, controller, device, module, processor, or any combination thereof, operable to employ all, or portions of, the method 400 of FIG. 4.

At step 402, the method starts. At block 404, a current state of each BIOS attribute in an information handling system is scanned. For example, the BIOS attributes may be stored in any suitable memory including, but not limited to, a BIOS/UEFI memory. At block 406, the current state of each attribute is compared to an initial state of the same attribute. At block 408, a determination is made whether one or more attributes have been changed. If no attributes have been changed the flow ends at block 410.

If one or more attributes have been changed, the changed attributes are stored in a memory as BIOS events at block 412. At block 414, each changed attribute or BIOS event is converted into a different threat event. For example, the BIOS events may be converted into threat events in any suitable manner including, but not limited to, converting the BIOS events from a current format to a string format for the threat events. The string format for a particular threat event may include 'attribute name, current value'.

At block 416, a list of threat events is provided to each threat chain in an information handling system. At block 418, a determination is made whether each threat event matches criteria of the threat chain. For example, the criteria for a threat chain may be stored within a threat chain policy associated with the particular threat chain. At block 420, threat event match results are provided based on whether the criteria of the threat chain have been matched. For example, the threat event match results may be evaluated, and determination may be made if the state of the current chain has changed. If the state of the current chain has changed, a threat state change is created describing the chain criteria that has been matched or unmatched along with the match indicator. In certain examples, the match indicator may be any suitable identifier for a level or degree of the match including, but not limited to, cleared, partially-matched, and fully-matched.

At block 422, a determination is made whether another threat chain exists in the information handling system. If so, the flow continues as stated above at block 418. Otherwise, an aggregated list of threat state changes is provided at block 424. For example, the aggregated list may include the threat state changes for every threat chain in the information handling system. At block 426, a notification of threat state changes is provided to a user of the information handling system, and the flow ends at block 410. For example, the user may be notified in any suitable manner including, but not limited to, the threat state changes being written to a log and a message displayed on a console of the information handling system.

Figure 5:
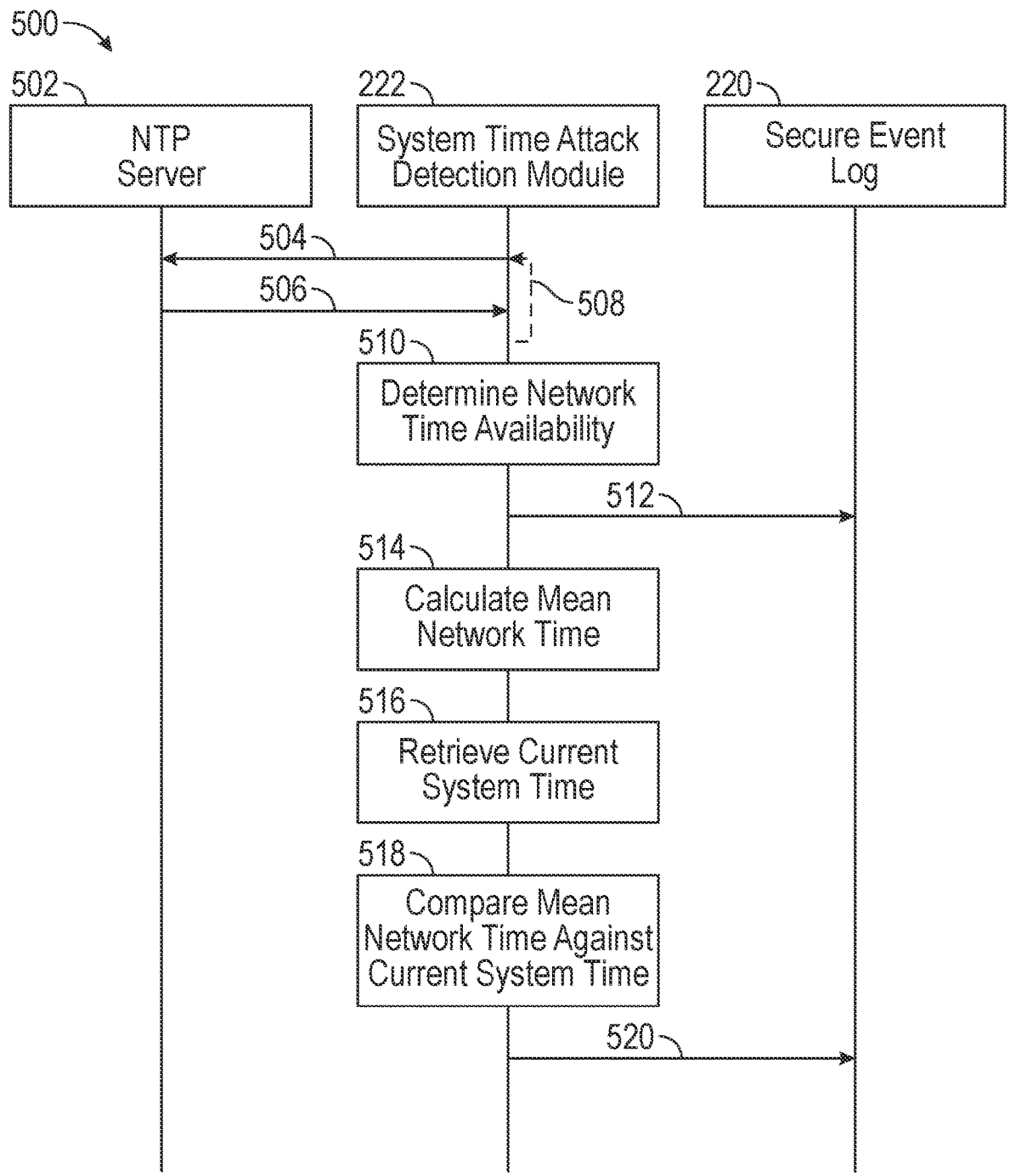
FIG. 5 illustrates an example system clock monitoring method that may be performed to monitor the system clock of an IHS according to one embodiment of the present disclosure.

FIG. 5 illustrates an example system clock monitoring method 500 that may be performed to monitor the system clock of an IHS according to one embodiment of the present disclosure. The system clock monitoring method 500 may be performed by a processor, such as processor 202 of FIG. 2. The method 500 may be performed at any suitable time. In one embodiment, the method 500 is performed at ongoing intervals (e.g., periodically), such as once every 10 minutes, once an hour, once a day, and the like. Additionally, the method 500 may be performed in the background mode and does not require explicit user input in order to control its operation. Initially, the IHS is booted and is operated in a normal manner.

At step 504, the system time attack detection module 222 requests the network time from an online NTP server 502. The online NTP server may include any online source that provides current network time information. One NTP server, for example, may be 'nist.gov' website that provides a current date and time upon request. Other online NTP servers exist. Thereafter at step 506, the system time attack detection module 222 receives the current network time from the NTP server 502. In one embodiment, the system time attack detection module 222 requests, and obtains the network time from other online NTP servers 502. For example, steps 504 and 506 may be repeated for each additional NTP server 502 that is accessed for obtaining the network time as illustrated by dashed arrow 508. In one embodiment, the system time attack detection module 222 accesses the list of available NTP servers 502 stored in memory 206 to identify those NTP servers 502 that may be accessed by the system time attack detection module 222.

At step 510, the system time attack detection module 222 determines a network time availability. The network time availability generally refers to an attribute associated with whether or not the system time attack detection module 222 is able to obtain the current network time. In one embodiment, the network time availability attribute comprises two values (e.g., 0—network time is available, and 1—network time is not available) and may be set according to one or more configurable policies. For example, the system time attack detection module 222 may determine that network time is available when a specified quantity of network time values are successfully obtained from the NTP servers 502. In a particular example in which three NTP servers 502 are accessed, the system time attack detection module 222 may determine that network time is available when only one network time value is obtained, or two network time values are obtained based upon the policies configured for the network time availability attribute. As another example, the system time attack detection module 222 may determine that network time is available when a specified percentage of network time values are successfully obtained from the NTP servers 502. Given the particular example in which three NTP servers 502 are accessed, the system time attack detection module 222 may determine that network time is available when greater than half (e.g., two or more) of the NTP servers 502 respond with the current network time based upon the network time availability policies. Thereafter at step 512, the system time attack detection module 222 transmits the determined network time availability value to the secure event log 220 to be stored therein.

At step 514, the system time attack detection module 222 calculates a mean network time using the obtained network time values from multiple NTP servers 502. Step 514 is only performed if the network time is obtained from multiple NTP servers 502. That is, step 514 may not be performed if the system time attack detection module 222 only obtains the network time value from a single NTP server 502. In one embodiment, the system time attack detection module 222 may determine if any outlier values exist, and if so, discard the outlier network time values.

At step 516, the system time attack detection module 222 retrieves the current system time. The system time attack detection module 222 then compares the mean network time against the retrieved system time at step 518 to derive a system time match attribute. In one embodiment, the system time attack detection module 222 compares the mean network time against the retrieved system time according to a configurable threshold policy. For example, the threshold value may be an amount of time error (e.g., 5 seconds, 1 minute, etc.) that may be used as a threshold for determining whether or not the system time is considered to be matched with the network time. In another embodiment, the system time match attribute has two possible values, namely, '0' if the system time matches the network time, and '1' if the system time does not match the network time. Thereafter at step 520, the system time attack detection module 222 transmits the system time match attribute to the secure event log 220 to be stored therein.

The method 500 may repeatedly performed at ongoing intervals to monitor the system time for potential illicit system time values, determine whether the system time has been illicitly changed, and report the results of the determination to the secure event log 220. Nevertheless, when use of the method 500 is no longer needed or desired, the method 500 ends.

Figure 6:
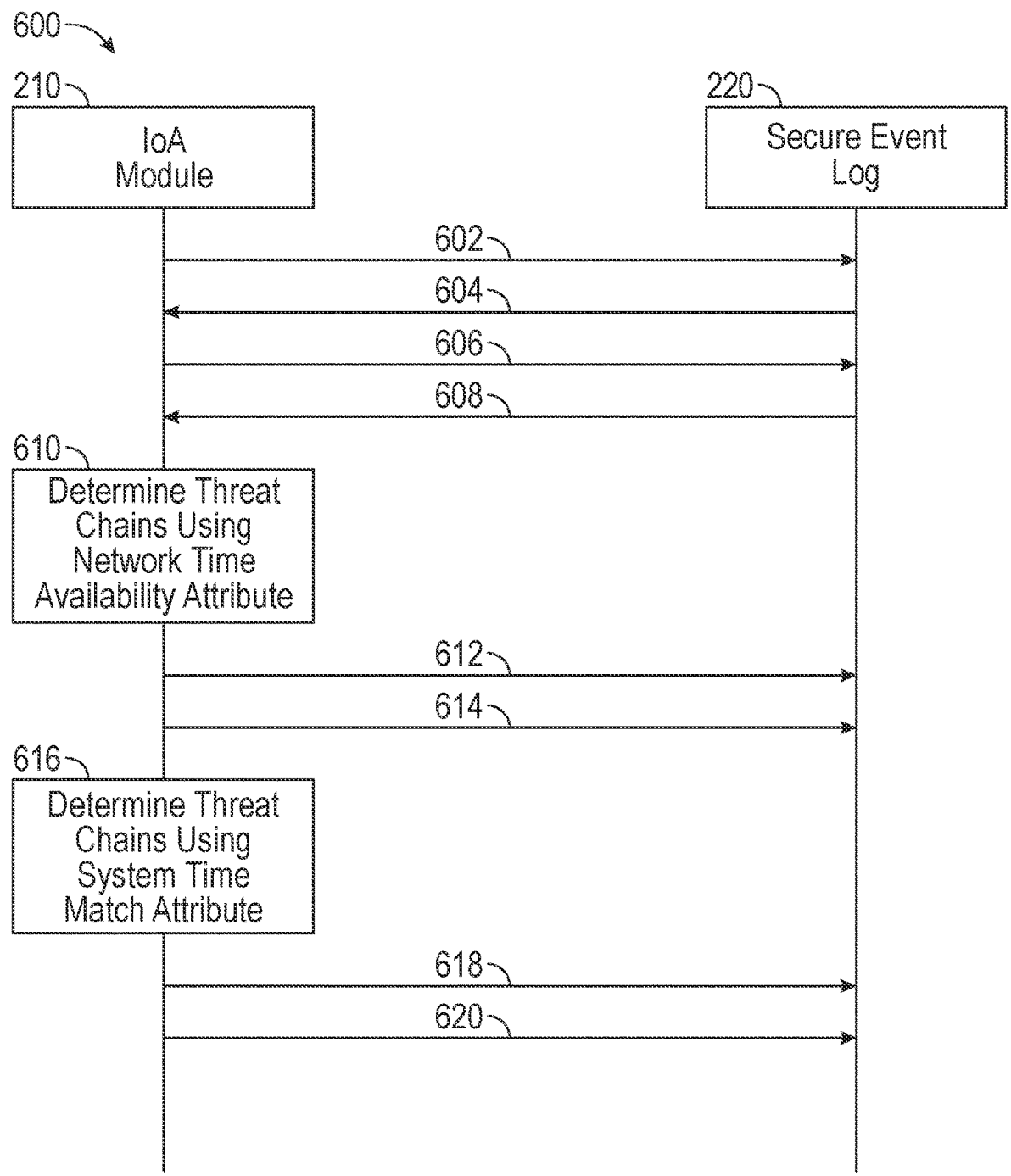
FIG. 6 illustrates an example system time analysis method that may be performed for analyzing the system time availability attribute and the system time match attribute according to one embodiment of the present disclosure.

FIG. 6 illustrates an example system time analysis method 600 that may be performed for analyzing the system time availability attribute and the system time match attribute according to one embodiment of the present disclosure. The method 600 may be performed in whole, or in part, by information handling system 100 depicted in FIG. 1, information handling system 200 in FIG. 2, or any other type of system, controller, device, module, processor, or any combination thereof, operable to employ all, or portions of, the method 600. While the present embodiment only describes the use of the system time availability attribute and the system time match attribute for setting or resetting an attack chain (e.g., network time availability attack chain, system clock attack chain), it should be appreciated that the IoA module 210 may use the system time availability attribute and the system time match attribute in conjunction with other attributes stored within the BIOS/UEFI memory to set or reset other attack chains without departing from the spirit and scope of the present disclosure. Initially, the method 500 of FIG. 5 may be performed to determine the system time availability attribute and the system time match attribute, and store those values in the secure event log 220.

At step 602, the IoA module 210 issues a request to obtain the network time availability attribute from the secure event log 220, and at step 604, obtains the requested network time availability attribute. At step 606, the IoA module 210 issues a request to obtain the system time match attribute from the secure event log 220, and at step 608, obtains the requested system time match attribute.

At step 610, the IoA module 210 determines one or more threat chains 214 using the network time availability attribute. For example, the IoA module 210 may use the network time availability attribute in conjunction with one or more other attributes associated with the BIOS/UEFI memory to identify a particular pattern that may be indicative of a threat, and set a threat chain 214 associated with that particular pattern. That is, the IoA module 210 may use the network time availability attribute in conjunction with one or more BIOS attributes as described above with reference to FIG. 3 to detect a threat chain 214. As another example, the IoA module 210 may use the network time availability attribute alone to set or reset a previously set threat chain 214, such as a network time availability threat chain 214. The IoA module 210 then sets the identified threat chains 214 in the secure event log 220 at step 612. Also at step 614, the IoA module 210 may reset any previously set threat chains 214 that are no longer indicative of a threat.

At step 616, the IoA module 210 determines one or more threat chains 214 using the system time match attribute. For example, the IoA module 210 may use the system time match attribute in conjunction with one or more other attributes associated with the BIOS/UEFI memory to identify a particular pattern that may be indicative of a threat, and set a threat chain 214 associated with that particular pattern. That is, the IoA module 210 may use the system time match attribute in conjunction with one or more BIOS attributes as described above with reference to FIG. 3 to detect a certain threat chain 214. As another example, the IoA module 210 may use the system time match attribute by itself to set or reset a previously set threat chain 214, such as a system time match threat chain 214. The IoA module 210 then sets the identified threat chains 214 in the secure event log 220 at step 618. Also at step 620, the IoA module 210 may reset any previously set threat chains 214 that are no longer indicative of a threat.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included in IHS 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board level product having portions thereof that can also be any combination of hardware and software.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
a processor; and
a memory coupled to the processor, the memory having instructions stored thereon that, upon execution by the processor, cause the IHS to:
obtain a system time from a system clock configured in the IHS;
obtain a network time from a network time protocol (NTP) server;
compare the system time against the network time; and
when the system time does not match the network time, set a system clock attack chain vector in a secure event log and generate an Indicator of Attack (IoA) report based at least in part, on the system clock attack chain vector;
when the system time matches the network time, reset the system clock attack chain vector in the secure event log; and
set a different attack chain vector in the secure event log and generate another IoA report based, at least in part, on the system clock attack chain vector and at least one attribute associated with at least one of a Basic Input/Output System (BIOS) or a Unified Extensible Firmware Interface (UEFI).

2. The IHS of claim 1, wherein the instructions, upon execution, further cause the IHS to obtain the network time from a plurality of the NTP servers, obtain a mean value based on the network time from each of the NTP servers, and compare the system time against the mean network time.

3. The IHS of claim 2, wherein the instructions, upon execution, further cause the IHS to identify at least one network time that is an outlier and discard the one network time outlier.

4. The IHS of claim 1, wherein the instructions, upon execution, further cause the IHS to compare the system time against the network time using a policy-configured threshold.

5. The IHS of claim 1, wherein the instructions, upon execution, further cause the IHS to: when the network time is not available from the NTP server, set a network time availability attack chain vector in the secure event log and generate an Indicator of Attack (IoA) report based, at least in part, on the network time availability attack chain vector.

6. The IHS of claim 5, wherein the instructions, upon execution, further cause the IHS to: when the network time is obtained after the network time availability attack chain vector has been set, reset the network time availability attack chain vector in the secure event log.

7. The IHS of claim 5, wherein the instructions, upon execution, further cause the IHS to determine that the network time is not available according to one or more policy-configured thresholds.

8. The IHS of claim 1, wherein the instructions, upon execution, further cause the IHS to obtain the system time, obtain the network time, and compare the system time against the network time on a periodic basis.

9. A method, comprising:
obtaining a system time from a system clock configured in an Information Handling System (IHS);
obtaining a network time from a network time protocol (NTP) server;
comparing the system time against the network time;
when the system time does not match the network time, setting a system clock attack chain vector in a secure event log and generating an Indicator of Attack (IoA) report based at least in part, on the system clock attack chain vector;
when the system time matches the network time, reset the system clock attack chain vector in the secure event log; and
set a different attack chain vector in the secure event log and generate another IoA report based, at least in part, on the system clock attack chain vector and at least one attribute associated with at least one of a Basic Input/Output System (BIOS) or a Unified Extensible Firmware Interface (UEFI).

10. The method of claim 9, further comprising obtaining the network time from a plurality of the NTP servers, obtaining a mean value based the network time from each of the NTP servers, and comparing the system time against the mean network time.

11. The method of claim 9, further comprising, when the system time matches the network time, resetting the system clock attack chain vector in the secure event log.

12. The method of claim 9, further comprising, when the network time is not available from the NTP server, setting a network time availability attack chain vector in the secure event log and generating another Indicator of Attack (IoA) report based at least in part, on the network time availability attack chain vector.

13. The method of claim 9, further comprising obtaining the system time, obtaining the network time, and comparing the system time against the network time on a periodic basis.

14. A hardware memory device having program instructions stored thereon that, upon execution by a processor of an Information Handling System (IHS), cause the IHS to:
obtain a system time from a system clock configured in the IHS;
obtain a network time from a network time protocol (NTP) server;
compare the system time against the network time;
when the system time does not match the network time, set a system clock attack chain vector in a secure event log and generate an Indicator of Attack (IoA) report based, at least in part, on the system clock attack chain vector; and
when the system time matches the network time, reset the system clock attack chain vector in the secure event log;
when the system time matches the network time, reset the system clock attack chain vector in the secure event log; and
set a different attack chain vector in the secure event log and generate another IoA report based, at least in part, on the system clock attack chain vector and at least one attribute associated with at least one of a Basic Input/Output System (BIOS) or a Unified Extensible Firmware Interface (UEFI).

15. The hardware memory device IHS of claim 14, wherein the instructions, upon execution, further cause the IHS to: when the network time is not available from the NTP server, set a network time availability attack chain vector in the secure event log and generate another IoA report based at least in part, on the network time availability attack chain vector.

16. The hardware memory device of claim 15, wherein the instructions, upon execution, further cause the IHS to: when the network time is obtained after the network time availability attack chain vector has been set, reset the network time availability attack chain vector in the secure event log.

* * * * *